US009729704B2

(12) United States Patent
Bajema et al.

(10) Patent No.: US 9,729,704 B2
(45) Date of Patent: *Aug. 8, 2017

(54) PLAYING A PERSONALIZED PRERECORDED AUDIO OF A CALL RECIPIENT TO THE CALL RECIPIENT TO AUTHENTICATE A TELEPHONE CALLER

(71) Applicant: International Business Machines Corporation, Armonk, NY (US)

(72) Inventors: Daniel T. Bajema, Lake Elsinore, CA (US); Jeffrey R. McCallum, Tucson, AZ (US); Thuan Q. Nguyen, Tucson, AZ (US); Socheat Sou, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/822,743

(22) Filed: Aug. 10, 2015

(65) Prior Publication Data
US 2016/0150075 A1    May 26, 2016

Related U.S. Application Data

(63) Continuation of application No. 14/550,683, filed on Nov. 21, 2014.

(51) Int. Cl.
*H04M 1/64* (2006.01)
*H04M 3/38* (2006.01)
(Continued)

(52) U.S. Cl.
CPC ....... *H04M 3/385* (2013.01); *H04M 3/42068* (2013.01); *H04M 3/4365* (2013.01); *H04W 4/12* (2013.01); *H04W 12/06* (2013.01)

(58) Field of Classification Search
CPC .................. H04M 2201/40; H04M 3/385
(Continued)

(56) References Cited

U.S. PATENT DOCUMENTS 7,278,025 B2    10/2007    Saito et al.
8,054,957 B2    11/2011    Brown et al.
(Continued)

FOREIGN PATENT DOCUMENTS

NL    WO 2012100904 A1 *    8/2012    ......... H04L 63/0853

OTHER PUBLICATIONS

IBM,"Caller/Called Authentication in a Phone Call", dated Mar. 28, 2006, an IP.com Prior Art Database Technical Disclosure, Total 9 pages.
(Continued)

*Primary Examiner* — Van D Huynh
(74) *Attorney, Agent, or Firm* — Rabindranath Dutta; Konrad, Raynes, Davda and Victor LLP (57) ABSTRACT

An audio segment recorded by an individual is stored in a computational device controlled by an entity, where the computational device is coupled to a telephony device having a speaker and a microphone that are configurable to be enabled or disabled by the computational device. An electronic communication is initiated to the individual via the telephony device when the speaker and the microphone are both enabled. The stored audio segment is retrieved from an audio recording database that stores a plurality of audio segments of a plurality of individuals and played to the individual to authenticate the entity, in response to the initiating of the electronic communication to the individual.

8 Claims, 10 Drawing Sheets

(51) Int. Cl.
H04M 3/42 (2006.01)
H04M 3/436 (2006.01)
H04W 4/12 (2009.01)
H04W 12/06 (2009.01)

(58) Field of Classification Search
USPC .................................. 379/68, 88.02, 142.05
See application file for complete search history.

(56) References Cited

U.S. PATENT DOCUMENTS

| | | | | |
|---|---|---|---|---|
| 8,825,487 B2* | 9/2014 | Zhang | ..................... | G06F 21/43 704/270 |
| 2004/0203595 A1 | 10/2004 | Singhal | | |
| 2006/0040643 A1* | 2/2006 | O'Connor | ....... | H04M 1/2745 455/412.1 |
| 2007/0255953 A1* | 11/2007 | Peyret | ....................... | H04L 9/32 713/168 |
| 2011/0258121 A1* | 10/2011 | Kauniskangas | ........ | G06Q 20/20 705/67 |

OTHER PUBLICATIONS

IBM,"Use of Voice Recognition to Improve Effectiveness, Efficiency, and Security of Telephone Conference Calls", dated Oct. 11, 2007, an IP.com Prior Art Database Technical Disclosure,Total 5 pages.

Raphael Satter, "Banks Harvest Callers' Voiceprints to Fight Fraud", (online) retrieved from the Internet on Oct. 13, 2014, at URL>http://license.icopyright.net/user/viewFreeUse.act?fuid=MTg1NTQ3Mjc%3D&one_b . . . , The Washington Times, Total 2 pages.

US Patent Application, dated Nov. 21, 2014, for U.S. Appl. No. 14/550,683, filed Nov. 21, 2014, invented by Daniel T. Bajema et al., Total 34 pages.

Preliminary Amendment, dated Aug. 10, 2015, for U.S. Appl. No. 14/550,683, filed Nov. 21, 2014, invented by Daniel T. Bajema et al., Total 17 pages.

Lists of Related Applications, pp. 2, dated Aug. 10, 2015.

Response to Office Action 1 for U.S. Appl. No. 14/550,683, dated Aug. 22, 2016, 10 pp.

Office Action 1 for U.S. Appl. No. 14/550,683, dated May 20, 2016, 20 pp.

Final Office Action, dated Nov. 9, 2016, for U.S. Appl. No. 14/550,683, filed Nov. 21, 2014, invented by D.T. Bajema et al., Total 19 pages.

Response to Final Office Action, dated Feb. 9, 2017, for U.S. Appl. No. 14/550,683, filed Nov. 21, 2014, invented by D.T. Bajema et al., Total 11 pages.

Notice of Allowance, dated Mar. 22, 2017, for U.S. Appl. No. 14/550,683 (72.52) filed Nov. 21, 2014, invented by D.T. Bajema et al., Total 18 pages.

* cited by examiner

PLAYING A PERSONALIZED PRERECORDED AUDIO OF A CALL RECIPIENT TO THE CALL RECIPIENT TO AUTHENTICATE A TELEPHONE CALLER

CROSS-REFERENCE TO RELATED APPLICATION

This application is a continuation of U.S. patent application Ser. No. 14/550,683, filed Nov. 21, 2014, which application is incorporated herein by reference in its entirety.

BACKGROUND

1. Field

Embodiments relate to the playing of a personalized prerecorded audio of a call recipient to the call recipient to authenticate a telephone caller.

2. Background

Every year, thousands of people lose money to telephone fraud. Callers who perpetrate fraud may cheat people out of money. Some caller may seem very friendly. They may claim to work for a company the call recipient trusts, or they may send electronic mails or place advertisements to convince people to call them at a telephone number.

Caller Identification, or "Caller ID," may allow a call recipient to identify a caller before the call recipient answers the telephone. A caller's number and/or name are displayed on the call recipient's phone if the phone has the "Caller ID" feature activated by the call recipient. Caller ID service, however, is susceptible to fraud. Using a practice known as "caller ID spoofing," callers may deliberately falsify the telephone number and/or name relayed as the Caller ID information to disguise the identity of the caller or the caller's business entity. For example, identity thieves who may want to collect sensitive information related to a bank account may use caller ID spoofing to make it appear as though they were calling from the bank of the call recipient.

Cloud computing is the delivery of computing as a service rather than a product. In cloud computing, shared resources, software, and information are provided to computers and other devices, such as telephony devices or telephony servers, as a utility over a network, such as the Internet.

SUMMARY OF THE PREFERRED EMBODIMENTS

Provided are a method, a system, and a computer program in which an audio segment recorded by an individual is stored in a computational device controlled by an entity, where the computational device is coupled to a telephony device having a speaker and a microphone that are configurable to be enabled or disabled by the computational device. An electronic communication is initiated to the individual via the telephony device when the speaker and the microphone are both enabled. The stored audio segment is retrieved from an audio recording database that stores a plurality of audio segments of a plurality of individuals and played to the individual to authenticate the entity, in response to the initiating of the electronic communication to the individual.

In certain embodiments, the electronic communication is a telephone call, where the telephone call is initiated by a representative of the entity to the individual via the telephony device coupled to the computational device. The speaker of the telephony device is disabled while the stored audio segment is played to prevent the representative from hearing the audio segment recorded by the individual to ensure security of the stored audio segment.

In additional embodiments, the microphone of the telephony device is disabled while the stored audio segment is played to prevent the representative from interfering with the playing of the stored audio segment to the individual.

In further embodiments, the computational device is a telephony server and a telephony server application executes on the telephony server to control a plurality of telephony devices used by a plurality of representatives of the entity. Each of the plurality of telephony devices executes a caller application that communicates with the telephony server application within a cloud computing environment.

In certain embodiments, the stored audio segment is played to the individual, in response to an authentication of the individual to a website of the entity.

In yet further embodiments, the stored audio segment is played to the individual, in response to the individual requesting authentication of the entity via an application on a mobile phone.

In additional embodiments, the computational device controlled by an entity stores a token value that is recognized by the individual. An audio rendering of the stored token value is played to the individual to authenticate the entity, in response to the initiating of the electronic communication to the individual.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiment record a voice fingerprint of a customer with an entity, such as a business, from which the customer may receive telephone calls. Representatives or automated calling devices of the entity may use the voice fingerprint of the customer when contacting the customer. The voice fingerprint is used to authenticate to the customer that the entity is not an unknown third party who is attempting to perpetrate fraud on the customer. In certain embodiments, the digital fingerprint is a prerecorded voice recording, and the validation of the entity that is calling is provided to the caller via the digital voice recording of the caller's own unique prerecorded message stored with the entity.

Telemarketing Fraud and Certain Embodiments

Telemarketers may fool people into giving out their financial account numbers or other private information. However, when calls are initiated by companies with a legitimate business need, the caller has not yet been validated to the call recipient. The call recipient may be reluctant to talk with the caller or to provide any information that the caller may need.

In certain embodiments, the validation of the company calling may be provided to the call recipient via a digital voice recording of the recipient's own unique message (e.g., an account holder's own short recorded message). For example, the caller may state their company name ("This is Bank X"), and ask the call recipient to hear the digital voice recording of the recipient's own unique message. The call recipient is likely to be satisfied with the identity of the caller once he hears the digital voice recording. The caller may then ask the call recipient to provide his account numbers or other sensitive information. Since the audio recording is in the individual's own voice, the individual's family members may also be able to verify the company as well and accept the call or take a message for the individual.

Embodiments

Figure 1:
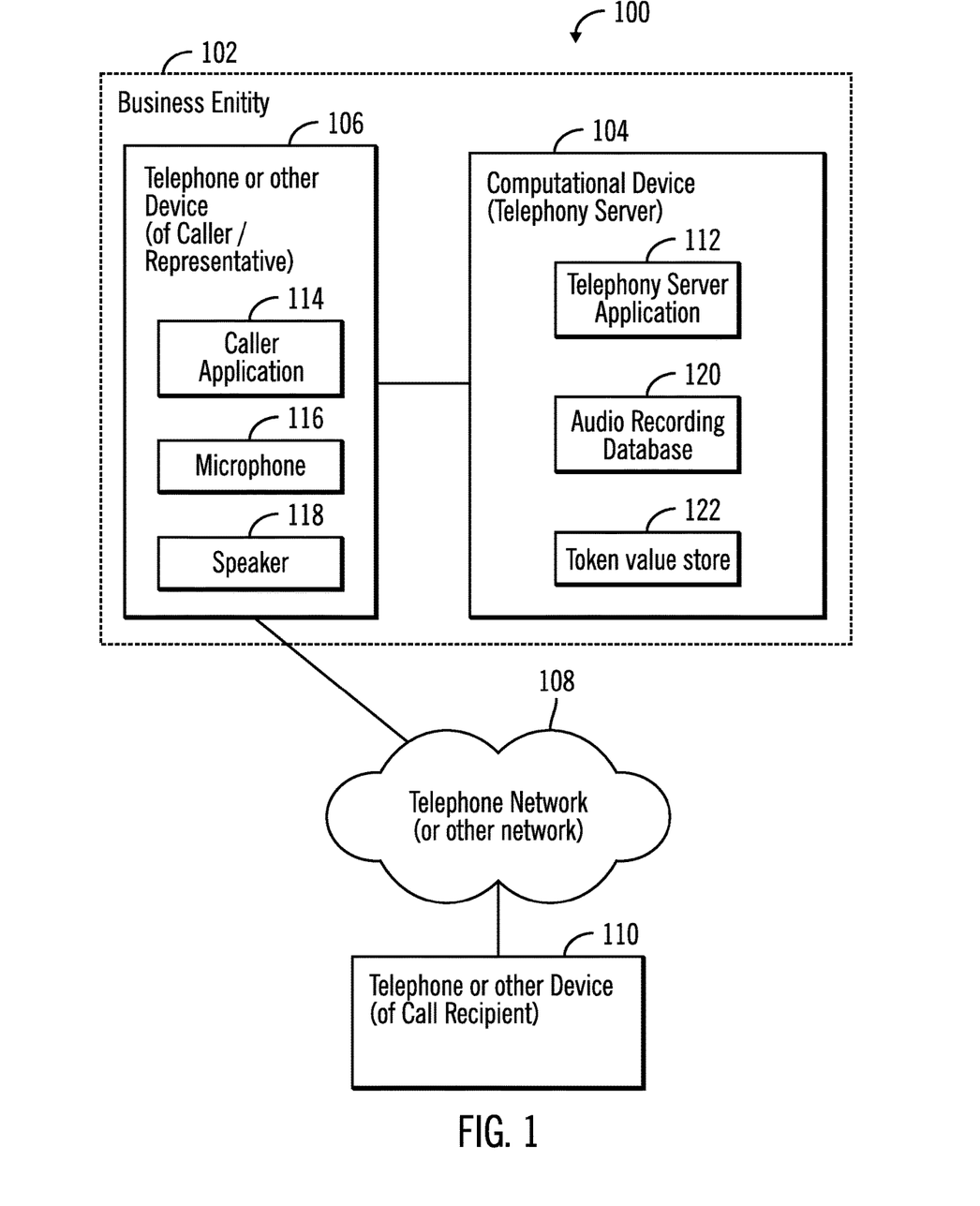
FIG. 1 illustrates a block diagram of a computing environment in which a business entity controls a telephony server and a representative of the business entity uses a telephone to call a customer over a telephone network, in accordance with certain embodiments.

FIG. 1 illustrates a block diagram of a computing environment 100 in which a business entity 102 controls a telephony server 104 or some other server. A representative of the business entity 102 uses a telephone 106 or some other device to communicate with a customer over a telephone network 108, in accordance with certain embodiments. The user may use a telephone 110 or some other device for communicating with representative over the telephone network 108. Other networks may be used instead of or in addition to the telephone network 108 for communications between the representative and the customer. The telephone 106 may be a smart phone or some other type of specialized phone with an operating system and provision for executing applications. The telephone 114 has a microphone 116 through which the representative may speak, and a speaker 118 through which the representative may hear.

The telephony sever 104 may comprise any suitable computational device including those presently known in the art, such as, a smartphone, a personal computer, a workstation, a server, a mainframe, a hand held computer, a palm top computer, a network appliance, a blade computer, a processing device, etc.

A telephony sever application 112 executes in the telephony server 104 and interacts with a caller application 114 that executes in the telephone 108. The telephony server application 112 and the caller application 114 may be implemented in software, hardware, firmware, or any combination thereof.

In certain embodiments, the telephony sever 104 may have an audio recording database 120. The audio recording database 120 may store audio segments of recordings made via telephonic communications via the telephones 110, 106 by customers of the business entity 102. The audio recording database may be stored in a computer readable storage medium that is a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In embodiments, the telephony server 104 may also have a token value store 122 that stores token values (e.g., numbers) that may be recognized by customers of the business entity 102, where each customer may have stored a token value that is known to the customer.

Therefore, FIG. 1 illustrates certain embodiments in which at least one recording made by a customer is stored in a telephony server. The at least one recording is played back to the customer when a representative of the business entity telephonically communicates with the customer. The customer on hearing the at least one recording is able to determine that he is communicating with the proper business entity and is not communicating with a person attempting to commit fraud.

Figure 2:
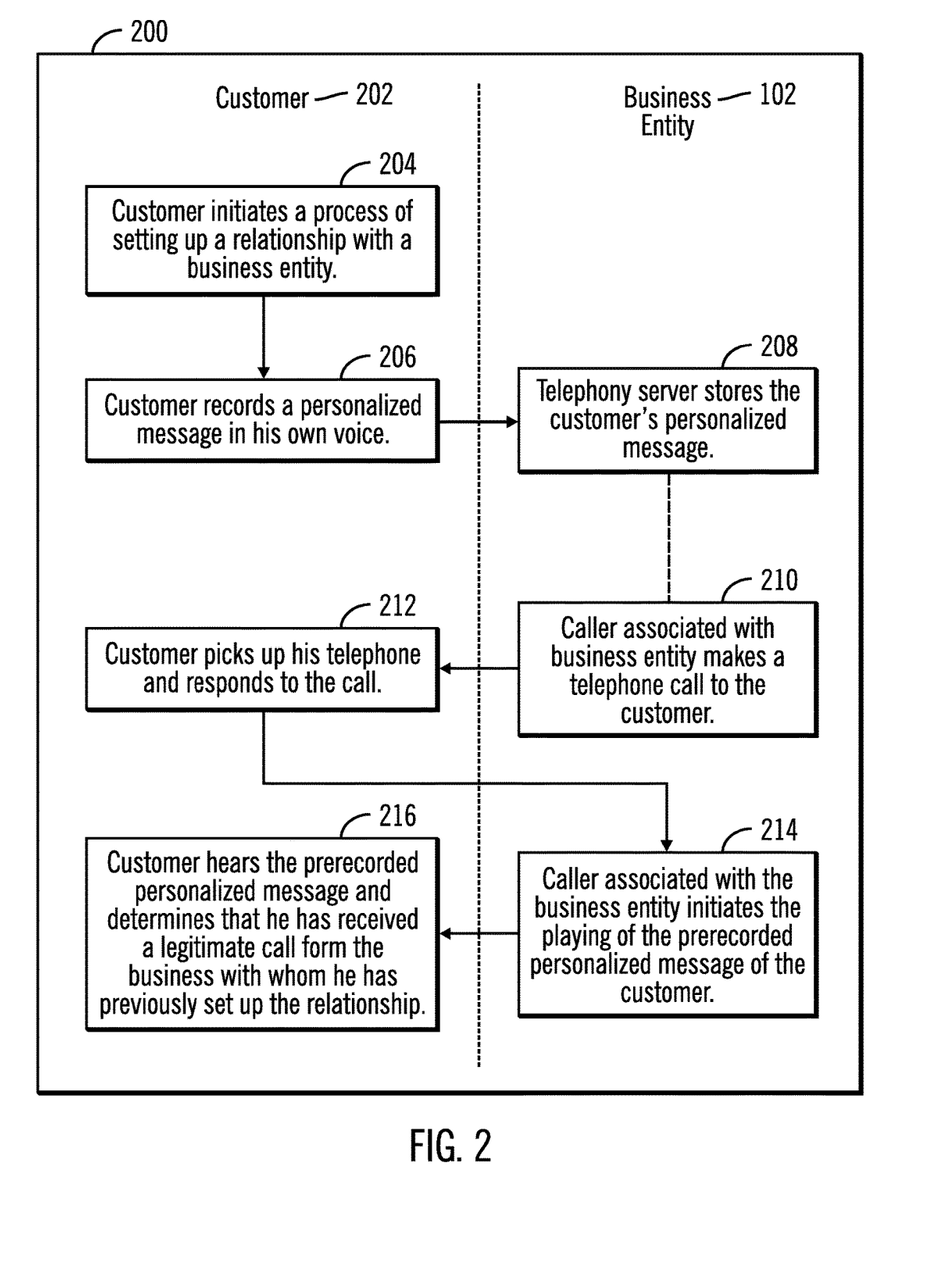
FIG. 2 illustrates flowchart that shows operations performed by the business entity via the telephony server and via the representative of the business entity, and operations performed by the customer, in accordance with certain embodiments.

FIG. 2 illustrates flowchart 200 that shows operations performed by the business entity 102 via the telephony server 104 and the representative of the business entity 102 and operations performed by the customer 202, in accordance with certain embodiments.

Control starts at block 204 in which a customer initiates a process of setting up a relationship with a business entity. For example if the business entity is a bank the customer may be opening a new account.

In the process of setting up the business relationship the customer records (at block 206) a personalized message in his own voice. For example, the customer may say "Hi, I am James and I have opened an account in Bank X". In certain embodiments, there may be a limitation on the duration of the personalized message. For example, the duration of the message may not exceed thirty seconds to save time for both the customer and the representative of the business entity. For recording the personalized message the customer may call into a special telephone number or go to the website of the business entity. The customer may provide their account information or login on the website. The customer may then create a sampled recording of his own voice as a digital file that is stored for the customer's account in an encrypted manner.

The telephony server 104 stores (at block 208) the customer's personalized message in the audio recording database 120. Subsequently, at a later point in time (e.g., after several days) a representative (i.e., caller) associated with the business entity makes (reference numeral 210) a telephone call to the customer. For example, the telephone call may be to verify from the customer whether certain activities on the account were legitimately made by the customer.

The customer picks up his telephone 110 and responds (at block 212) to the telephone call. At this point the customer is not sure as to whether the telephone call is actually from the business entity or whether somebody is attempting to commit fraud by attempting to impersonate the business entity.

Control proceeds to block 214 where the caller associated with the business entity initiates the playing of the prerecorded personalized message of the customer. The customer hears the prerecorded personalized message and determines (at block 216) that he has received a legitimate call from the business entity with whom had has previously set up the relationship. In certain embodiments, other members of the customer's household may also make the determination that the call is legitimate as they may be able to identify that the prerecorded personalized message was that of the customer.

Therefore, FIG. 2 illustrates certain embodiments in which a prerecorded message of the customer is played back to the customer to authenticate the business entity to the customer.

Figure 3:
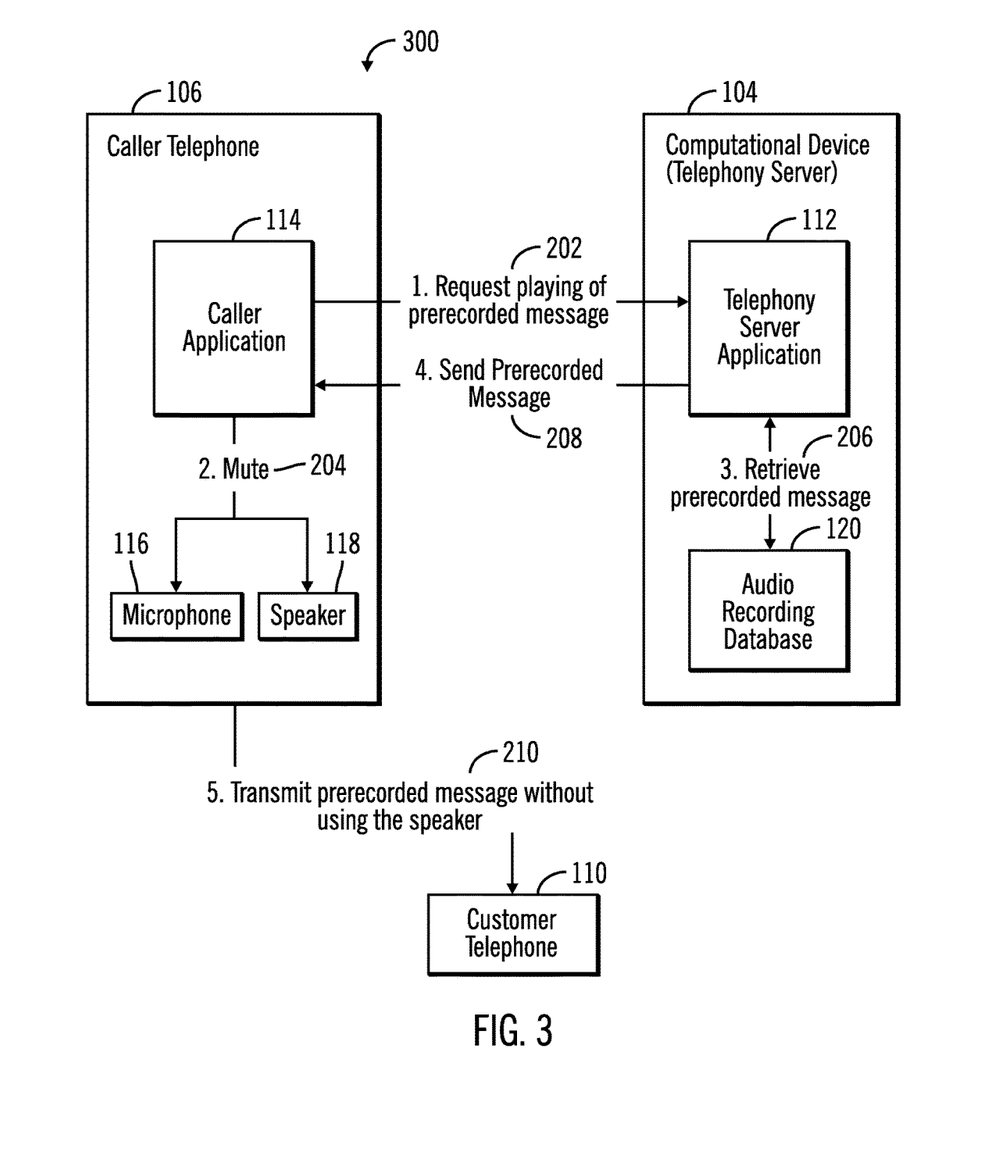
FIG. 3 illustrates a block diagram that shows how a microphone and a speaker of the telephone of the representative of the business entity is disabled, in accordance with certain embodiments.

FIG. 3 illustrates a block diagram 300 that shows how a microphone 116 and a speaker 118 of telephone of the representative of the business entity is disabled (e.g., muted), in accordance with certain embodiments.

When the customer picks up the telephone (in FIG. 2, block 212) call from the caller, the caller application 114 on the caller's telephone 108 requests (reference numeral 202) a playing of the prerecorded message to the telephony server application 112, and mutes (reference numeral 204) the microphone 116 and the speaker 118. The speaker 118 of the telephony device 106 is disabled (i.e., muted) while the stored audio segment (i.e., the prerecorded personalized message) is played to prevent the representative from hearing the audio segment recorded by the customer to ensure security of the stored audio segment. The microphone 116 of the telephony device 106 is disabled while the stored audio segment is played to prevent the representative from interfering with the playing of the stored audio segment to the customer.

After the microphone 116 and the speaker 118 are muted, the telephony server 112 retrieves (reference numeral 206) the prerecorded message from the audio recording database 120 and sends (reference numeral 208) the prerecorded message to the caller application 114. The caller application 114 transmits (reference numeral 210) the prerecorded message to the customer telephone 110.

Therefore FIG. 3 illustrates certain embodiments in which the microphone 116 and speaker 118 of the caller's telephone are muted or otherwise disabled while the prerecorded message of the customer is played back to the customer. Subsequently, the microphone 116 and the speaker 118 are enabled and as a result the representative can communicate with the customer.

Figure 4:
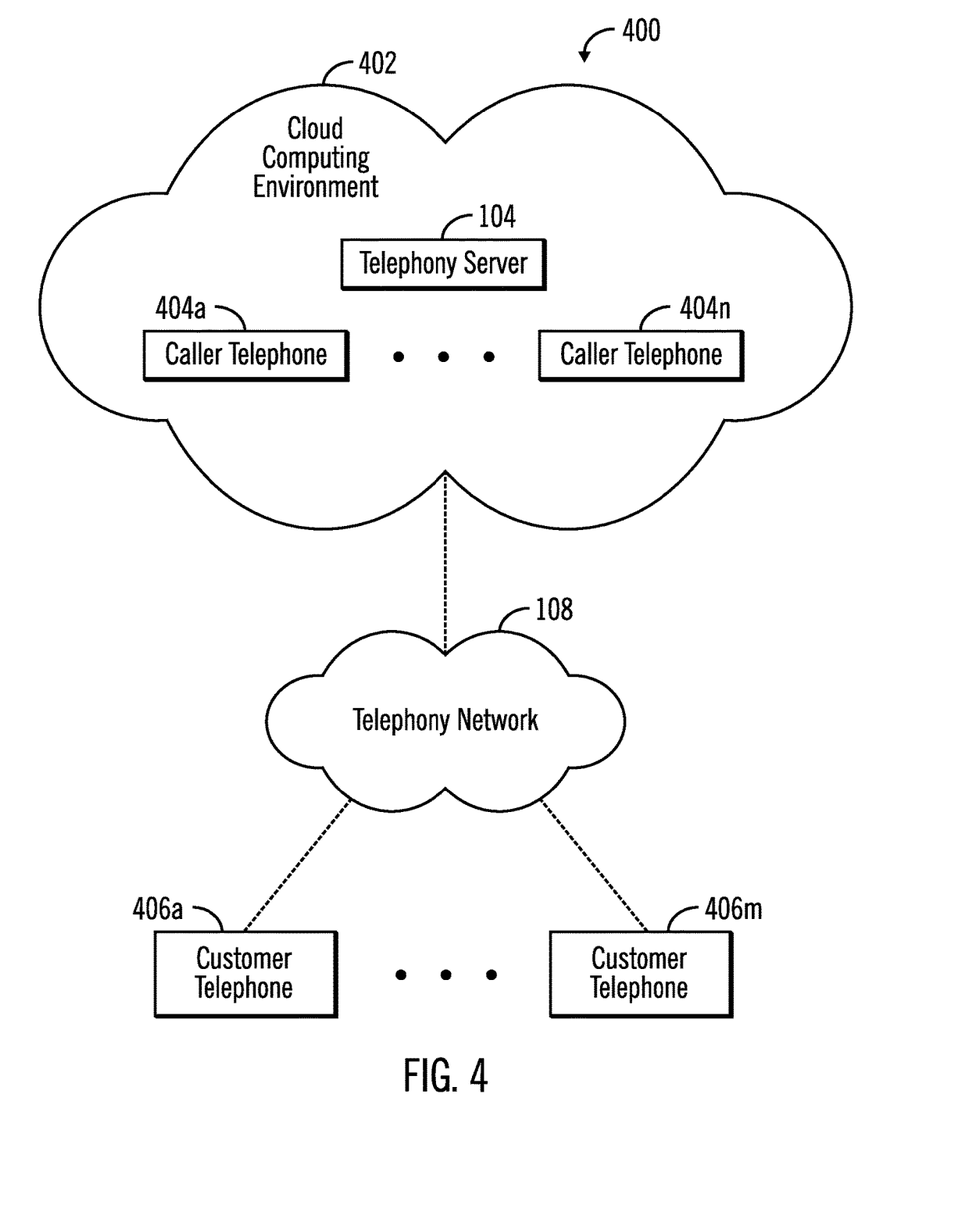
FIG. 4 illustrates a block diagram that shows a cloud computing environment in which the telephony server and the telephones of the representatives are maintained in accordance with certain embodiments.

FIG. 4 illustrates a block diagram 400 that shows a cloud computing environment 402 in which the telephony server 104 and the telephones 404a . . . 404n of the representatives of the business entity are maintained in accordance with certain embodiments. Within the cloud computing environment 402 the plurality of telephones 404a . . . 404n interact with the telephone server 104, and the telephony server 104 provides software and other services to the plurality of telephones 404a . . . 404n, where the plurality of telephones 404a . . . 404n communicate over the telephony network 108 with the customer telephones 406a . . . 406.

Figure 5:
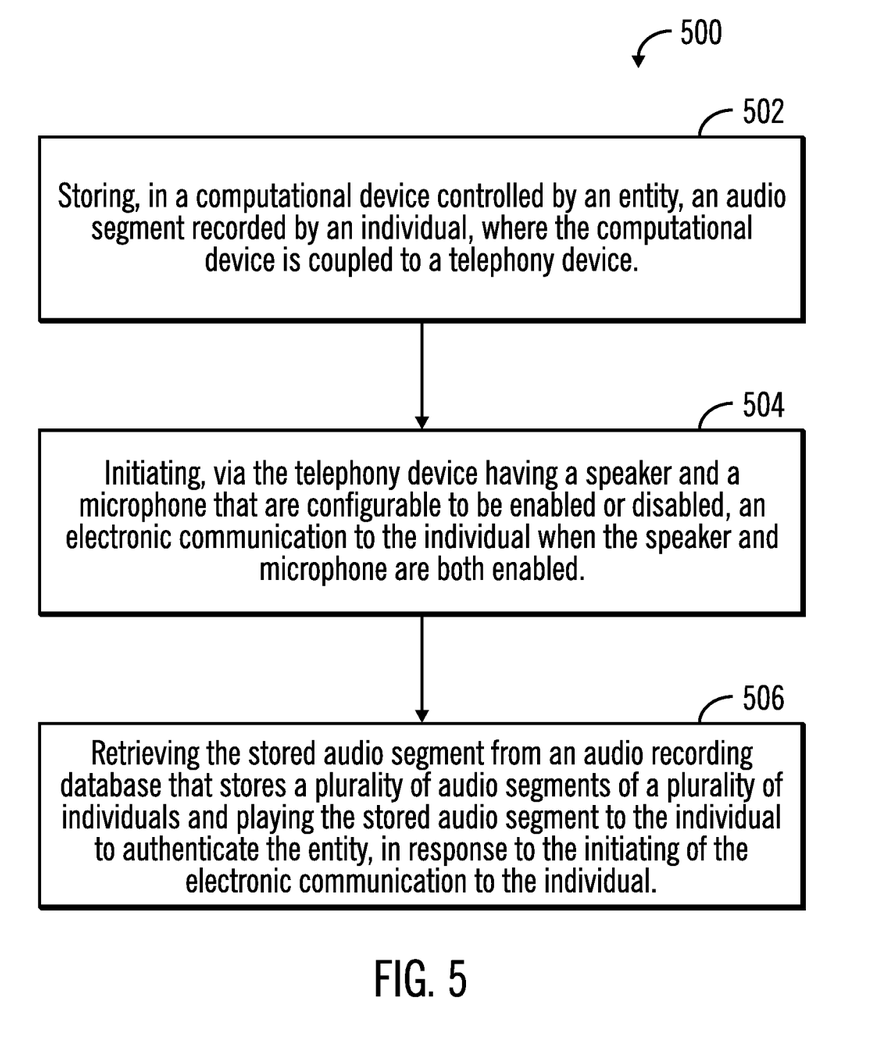
FIG. 5 illustrates a flowchart that shows operations for playing stored prerecorded audio segment for authentication of a caller, in accordance with certain embodiments.

FIG. 5 illustrates a flowchart 500 that shows operations for playing a stored prerecorded audio segment for authentication of a caller, in accordance with certain embodiments. The operations shown in FIG. 5 may be performed by the caller's telephone 106 and the telephony server 104. In certain embodiments, the operations performed by the telephony 106 and the telephony server 104 may be performed by a single device.

Control starts at block 502 in which an audio segment recorded by an individual (e.g., customer) is stored in a computational device (e.g., telephony server 104) controlled by an entity (e.g., business entity), where the computational device is coupled to a telephony device 106. An electronic communication is initiated (at block 504) to the individual via the telephony device 106, where the telephony device 106 has a speaker 118 and a microphone 116 that are configurable to be enabled or disabled, and the electronic communication is initiated when the speaker 118 and the microphone 116 are both enabled. The stored audio segment is retrieved from an audio recording database 120 that stores a plurality of audio segments and played (at block 506) to the individual to authenticate the entity, in response to the initiating of the electronic communication to the individual. In certain embodiments, the plurality of stored audio segments may each correspond to the audio recording of a different customer, and the retrieval of the stored audio segment may be based on determining which audio segment of the plurality of audio segments corresponds to the audio segment of the individual to whom the electronic communication is being initiated in block 504.

Figure 6:
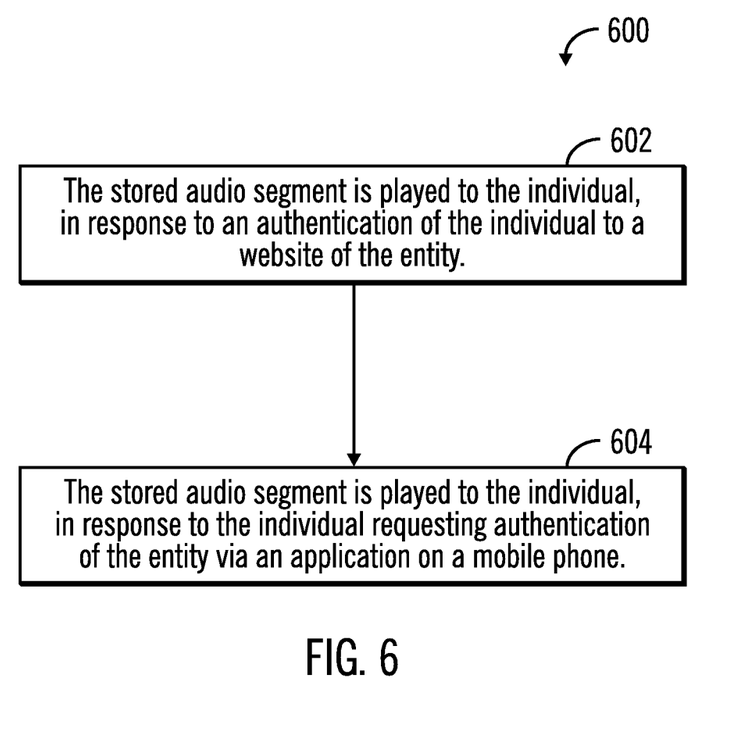
FIG. 6 illustrates a flowchart that shows additional operations for authenticating a caller via the playing of a stored audio segment, in accordance with certain embodiments.

FIG. 6 illustrates a flowchart 600 that shows operations for authenticating a caller via the playing of a stored audio segment, in accordance with certain embodiments. In certain embodiments, the stored audio segment is played to the individual, in response to an authentication of the individual to a website of the entity (block 602). The stored audio segment may also be played to the individual, in response to the individual requesting authentication of the entity via an application on a mobile phone (block 604).

Figure 7:
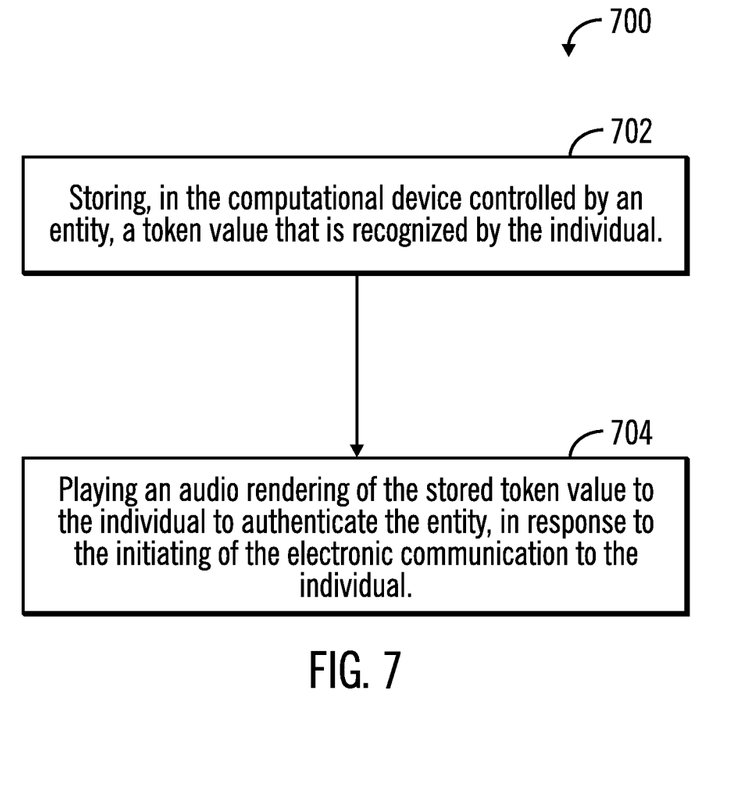
FIG. 7 illustrates a flowchart that shows operations for authenticating a caller via the audio rendering of a stored token value, in accordance with certain embodiments.

FIG. 7 illustrates a flowchart 700 that shows operations for authenticating a caller via the audio rendering of a stored token value, in accordance with certain embodiments. Control starts at block 702 in which, the computational device controlled by a business entity stores a token value that is recognized by the individual. An audio rendering of the stored token value is played (at block 704) to the individual to authenticate the entity, in response to the initiating of the electronic communication to the individual. For example, in one embodiment, a security company may provide a security token to the homeowner, where the security token is linked to the homeowner's account. When an alarm is triggered at a residence of the homeowner, the security company calls the homeowner's telephone. Before the homeowner provides any personal information (such as his password to an account) the homeowner asks for confirmation of the company's identity. The security company may then play an audio rendering of the numbers, characters, or words of the security token to the home owner to confirm the identity of the company. Then the home owner may provide his password to the security company to confirm the home owner's authenticity before the alarm is cancelled.

Therefore FIGS. 1-7 illustrate certain embodiments in which a prerecorded message or other audio identification associated with customer that is stored by a business entity is played back to the customer during electronic communication when the customer needs to verify the authenticity of the business entity.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
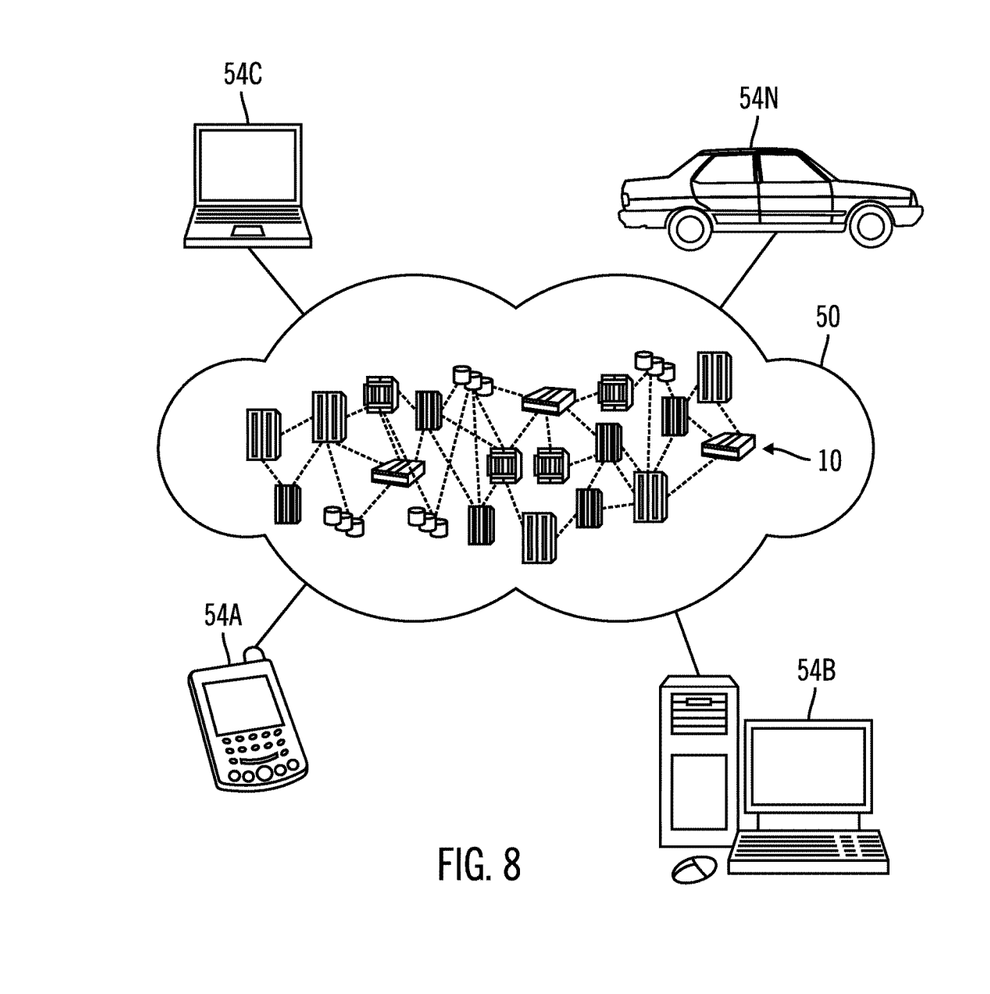
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
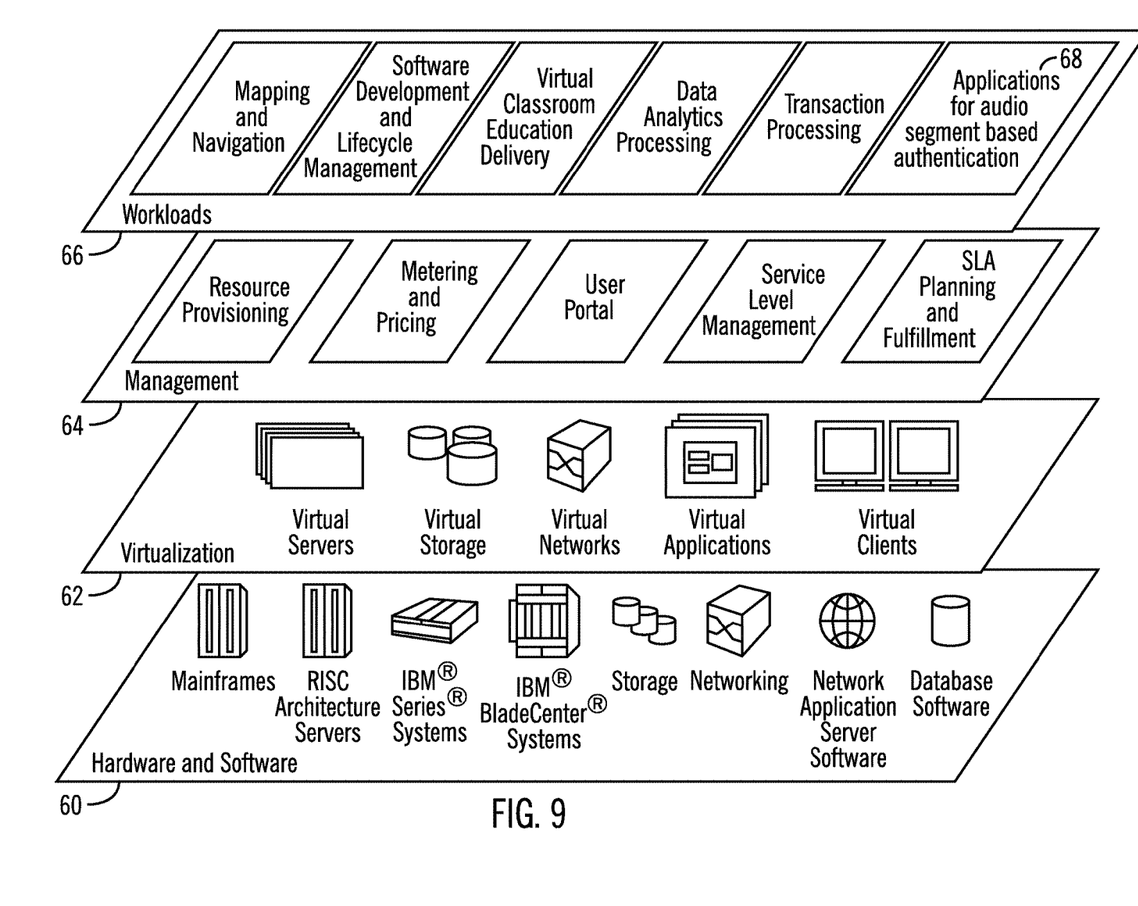
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and applications 68 for audio segment based authentication as described in FIGS. 1-7.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
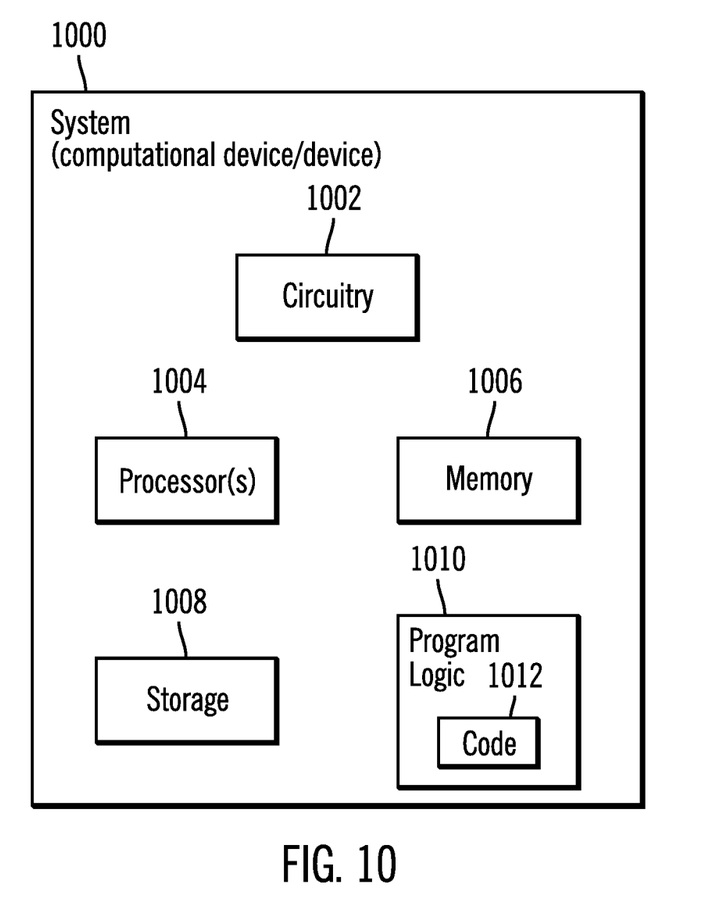
FIG. 10 illustrates a block diagram of a computational system that shows certain elements that may be included in the telephony server or the telephony devices, in accordance with certain embodiments.

FIG. 10 illustrates a block diagram that shows certain elements that may be included in one or more of the computational devices 104 or telephones 106, 110 in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended. affiliates.

What is claimed is:

1. A method, comprising:
storing in a token value store of a computational device controlled by an entity, a number that is recognized by an individual, wherein the number is provided by the entity to the individual, wherein the computational device is coupled to a telephony device, and wherein an audio segment is recorded by the individual and stored in the computational device;
initiating, via the telephony device having a speaker and a microphone that are configurable to be enabled or disabled, an electronic communication to the individual in response to the speaker and microphone being both enabled;
indicating by the entity a name that identifies the entity to the individual, and requesting the individual to hear an audio that includes the audio segment and an audio rendering of the number to the individual to authenticate the entity to the individual;
playing the audio to the individual to authenticate the entity to the individual, in response to the initiating of the electronic communication to the individual, subsequent to requesting the individual to hear the audio; and
in response to playing the audio, requesting the individual to provide an account of the individual.

2. The method of claim 1, wherein the electronic communication is a telephone call, wherein the telephone call is initiated by a representative of the entity to the individual via the telephony device coupled to the computational device, the method further comprising:
disabling the speaker of the telephony device while the audio is played to prevent the representative from hearing the audio to ensure security of the audio.

3. The method of claim 2, the method further comprising:
disabling the microphone of the telephony device while the audio is played to prevent the representative from interfering with the playing of the audio to the individual; and
subsequent to completion of the playing of the audio, enabling the speaker and the microphone of the telephony device to allow the representative to communicate with the individual.

4. The method of claim 3, wherein:
the computational device is a telephony server and a telephony server application executes on the telephony server to control a plurality of telephony devices used by a plurality of representatives of the entity; and
each of the plurality of telephony devices executes a caller application that communicates with the telephony server application within a cloud computing environment.

5. The method of claim 1, wherein the audio is played to the individual, in response to an authentication of the individual to a website of the entity.

6. The method of claim 1, wherein the audio is played to the individual, in response to the individual requesting authentication of the entity via an application on a mobile phone.

7. The method of claim 1, wherein:
in response to an alarm associated with the individual, initiating the electronic communication to the individual from the entity, and subsequently playing the audio, wherein the individual provides a password to the entity to confirm authenticity of the individual prior to cancellation of the alarm.

8. The method of claim 1, wherein the individual, in response to hearing the audio is able to determine that the entity is a proper entity, and that the entity is not attempting to commit fraud by attempting to impersonate the proper entity.

* * * * *